(12) United States Patent
Bae et al.

(10) Patent No.: US 7,714,961 B2
(45) Date of Patent: May 11, 2010

(54) DISPLAY PANEL AND METHOD OF MANUFACTURING THE SAME

(75) Inventors: Sung-Hwan Bae, Asan-si (KR); Jae-Ho Lee, Cheonan-si (KR); Su-Jeong Kim, Seoul (KR)

(73) Assignee: Samsung Electroncis Co., Ltd. (KR)

( * ) Notice: Subject to any disclaimer, the term of this patent is extended or adjusted under 35 U.S.C. 154(b) by 241 days.

(21) Appl. No.: 12/045,232

(22) Filed: Mar. 10, 2008

(65) Prior Publication Data

US 2008/0273133 A1  Nov. 6, 2008

(30) Foreign Application Priority Data

May 4, 2007  (KR) ..................... 10-2007-0043328

(51) Int. Cl.
  *G02F 1/1335* (2006.01)
(52) U.S. Cl. .................. 349/110; 349/42; 349/153; 445/25
(58) Field of Classification Search ............... 349/110, 349/42, 153; 445/25
  See application file for complete search history.

(56) References Cited

U.S. PATENT DOCUMENTS

| 7,453,192 | B2* | 11/2008 | Lee ............................ 313/288 |
| 7,551,259 | B2* | 6/2009 | Park et al. ................... 349/143 |
| 2005/0057541 | A1* | 3/2005 | Lee ............................ 345/204 |
| 2005/0179682 | A1* | 8/2005 | Shin et al. ................... 345/207 |

* cited by examiner

*Primary Examiner*—Ellen Kim
(74) *Attorney, Agent, or Firm*—Cantor Colburn LLP

(57) ABSTRACT

A display panel includes: a first substrate including a gate line and a data line crossing the gate line, a pixel portion formed in a display region and electrically connected to the gate and the data line and a gate driving part formed on a first peripheral region and electrically connected to the gate line; a second substrate having a light blocking layer formed on an area of the second substrate corresponding to the first peripheral region; and a seal line formed between the first substrate and the second substrate to confine a liquid crystal layer therebetween, the seal line being formed in an area outside an outer peripheral edge of the display region, the area outside the outer peripheral edge of the display region being closer to an outer peripheral edge of the light blocking layer than to the outer peripheral edge of the display region.

20 Claims, 10 Drawing Sheets

DISPLAY PANEL AND METHOD OF MANUFACTURING THE SAME

This application claims priority to Korean Patent Application No. 2007-43328, filed on May 4, 2007, and all the benefits accruing therefrom under 35 U.S.C. §119, the contents of which in its entirety are herein incorporated by reference.

BACKGROUND OF THE INVENTION

1. Field of the Invention

The present invention relates to a display panel and a method of manufacturing the display panel. More particularly, the present invention relates to a display panel capable of adjusting a transmittance of liquid crystal contained therein and a method of manufacturing the display panel.

2. Description of the Related Art

A liquid crystal display ("LCD") apparatus, which is a common flat panel display apparatus, has various desirable characteristics, such as being thin and lightweight, and having a low driving voltage, for example. As a result, the LCD apparatus is employed in various electronic devices such as monitors, notebook computers, mobile phones and large-sized television sets, for example.

The LCD apparatus typically includes an LCD panel which displays an image by controlling a transmittance of liquid crystal, a backlight assembly disposed under the LCD panel to provide the LCD panel with light, a printed circuit board ("PCB") for driving the LCD panel and a flexible printed circuit board ("FPCB") which electrically connects the PCB to the LCD panel.

The LCD panel typically includes a first substrate, a second substrate, a liquid crystal layer and a seal line. The first substrate includes a plurality of pixels and is electrically connected to the PCB through the FPCB. The second substrate faces the first substrate, and the liquid crystal layer is disposed between the first substrate and the second substrate. The seal line is also disposed between the first substrate and the second substrate to seal the liquid crystal.

The FPCB typically includes a gate circuit film to apply gate signals to the first substrate and a data circuit film to apply data signals to the first substrate.

The gate circuit film is electrically connected to a gate pad typically formed at a left lateral end portion, as viewed from a top perspective, e.g., viewing a top plan view, of the first substrate. Further, the data circuit film is electrically connected to a data pad typically formed at an upper lateral end portion, as viewed from the top perspective, of the first substrate. Additionally, a panel naming mark for indicating characteristics and records of the first substrate is generally formed at the left lateral end portion of the first substrate.

Since the gate pad and the panel naming mark are formed at the left lateral end portion of the first substrate and the data pad is formed at the upper lateral end portion of the first substrate, a size of the first substrate is necessarily larger than a size of the second substrate. In other words, the second substrate is physically smaller than the first substrate so that a left lateral end portion and the upper lateral end portion of the first substrate are exposed, e.g., not covered by the second substrate.

However, moisture may condense and form water droplets on the left lateral end portion and the upper lateral end portion of the first substrate. Further, the water droplets may spread on the left lateral end portion and the upper lateral end portion of the first substrate and thereby penetrate into a space between the first substrate and the second substrate, causing a display quality of the LCD apparatus to deteriorate.

BRIEF SUMMARY OF THE INVENTION

Exemplary embodiments of the present invention provide a display panel capable of preventing water from penetrating a space between a first substrate and a second substrate, thereby enhancing a display quality. Exemplary embodiments of the present invention also provide a method of manufacturing the display panel.

A display panel according to an exemplary embodiment of the present invention includes a first substrate, a second substrate, a liquid crystal layer and a seal line.

The first substrate includes a gate line extending in a first direction, a data line extending in a second direction substantially perpendicular to the first direction and crossing the gate line, a pixel portion formed in a display region and electrically connected to the gate and the data line, and a gate driving part formed in a first peripheral region surrounding the display region and electrically connected to the gate line.

The second substrate faces the first substrate and includes a first end portion and an opposite second end portion which coincide with a first end portion and an opposite second end portion of the first substrate, respectively, and a light blocking layer formed on an area of the second substrate corresponding to the first peripheral region.

The liquid crystal layer is formed between the first substrate and the second substrate.

The seal line is formed between the first substrate and the second substrate to confine the liquid crystal layer therebetween. Further, the seal line is formed in an area outside an outer peripheral edge of the display region, the area outside the outer peripheral edge of the display region being closer to an outer peripheral edge of the light blocking layer than to the outer peripheral edge of the display region.

A first distance from a first side of the seal line substantially parallel to the second direction to a corresponding parallel first side of the display region is greater than a second distance from a second opposite parallel side of the seal line to a corresponding opposite second side of the display region.

An outer lateral edge of the first side of the seal line may substantially coincide with an outer lateral edge of the outside perimeter of the light blocking layer.

The pixel portion of the first substrate includes a thin-film transistor electrically connected to the gate line and the data line and a pixel electrode electrically connected to the thin-film transistor.

The gate driving part includes a driving transistor formed by a process of manufacturing the thin-film transistor.

The gate driving part is formed on at least one of a first end portion of the first substrate and a second opposite end portion of the first substrate.

Alternatively, the gate driving part may be formed on an area of the first substrate between the seal line and the display region.

The display panel may further include a second peripheral region, wherein the light blocking layer of the second substrate is not formed on an area of the second substrate corresponding to the second peripheral region.

The seal line may include: a first seal line portion formed at a left side of the display region substantially parallel to the first direction; a second seal line portion formed at a right side of the display region opposite to the left side of the display region substantially parallel to the first direction; a third seal line portion formed at a top side of the display region substantially parallel to the second direction and connected to an upper end of the first seal line portion and an upper end of the second seal line portion; and a fourth seal line portion formed at a bottom side of the display region opposite to the top side of the display region substantially parallel to the second direction and connected to a bottom end of the first seal line portion and a bottom end of the second seal line portion.

A distance between the first seal line portion and the display region is greater than a distance between the second seal line portion and the display region.

An outer left peripheral edge of the first seal line portion coincides with an outer left peripheral edge of the light blocking layer.

The gate driving part is formed between the first seal line portion and the display region.

A first portion of the gate driving part may be formed between the first seal line portion and the display region and a second portion of the gate driving part is formed between the second seal line portion and the display region.

The first substrate may further include a naming mark formed in the second peripheral region under the second substrate.

The display panel may further include a cell gap maintaining member disposed between the first substrate and the second substrate to maintain a cell gap between the first substrate and the second substrate. The cell gap maintaining member may include a dot spacer having elasticity.

The display panel may further include a third peripheral region having a pad region. The third peripheral region may be formed above the first peripheral region and not covered by the second substrate, and a longitudinal axis of the third peripheral region may be substantially parallel to the second direction.

The first substrate may further include a pad formed in the pad region of the third peripheral region.

The display panel may further include a water-proof member formed on the first substrate in the pad region of the third peripheral region adjacent to the second substrate to prevent water from penetrating an area between the first substrate and the second substrate.

A method of manufacturing a display panel according to an exemplary embodiment of the present invention includes forming a first mother substrate, forming a second mother substrate, forming a seal line, depositing liquid crystal, combining the first mother substrate and the second mother substrate to confine the liquid crystal therebetween, cutting a portion of the first mother substrate, and cutting a portion of the second mother substrate.

The first mother substrate has a gate line extending along a first direction, a data line extending along a second direction substantially perpendicular to the first direction and crossing the first direction, a pixel portion formed in a display region and electrically connected to the gate line and the data line, and a gate driving part formed in a peripheral region and electrically connected to the gate line.

The second mother substrate has a light blocking layer facing the peripheral region.

The seal line is formed on one of the first mother substrate and the second mother substrate, and is formed in an area outside an outer peripheral edge of the display region, the area outside the outer peripheral edge of the display region being closer to an outer peripheral edge of the light blocking layer than to the outer peripheral edge of the display region.

The liquid crystal is deposited onto one of the first mother substrate and the second mother substrate.

The portion of the first mother substrate is cut to form a first substrate having the gate line, the data line, the pixel portion and the gate driving part.

The portion of the second mother substrate is cut such that a first end portion of the second substrate and an opposite second end portion of the second substrate coincide with a first end portion of the first substrate and an opposite second end portion of the first substrate, respectively.

The seal line is formed such that a first distance from a first side of the seal line substantially parallel to the second direction to a corresponding parallel first side of the display region is greater than a second distance from a second opposite parallel side of the seal line to a corresponding opposite second side of the display region.

The seal line may be formed such that an outer lateral edge of the first side of the seal line substantially coincides with an outer lateral edge of the outside perimeter of the light blocking layer.

Thus, according to exemplary embodiments of the present invention, the second substrate is combined with the first substrate to cover the panel naming mark of the first substrate. Therefore, water is prevented from penetrating into a space between the first and second substrates.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1:
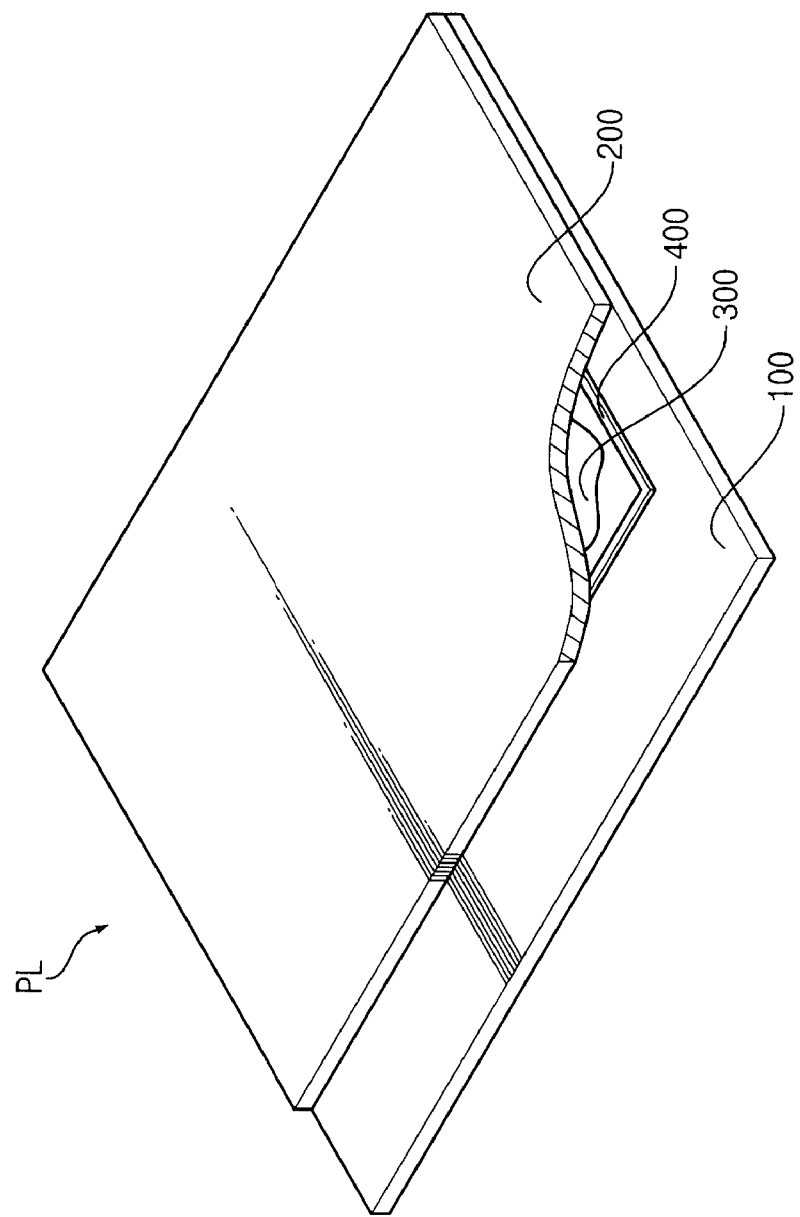
FIG. 1 is a top perspective view illustrating a display panel according to an exemplary embodiment of the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, the exemplary embodiments of the present invention will be explained in further detail with reference to the accompanying drawings.

FIG. 1 is a top perspective view illustrating a display panel according to an exemplary embodiment of the present invention.

Referring to FIG. 1, a display panel PL according to an exemplary embodiment of the present invention includes a first substrate 100, a second substrate 200, a liquid crystal layer 300, and a seal line 400.

The first substrate 100 includes a plurality of pixels (not shown) and a plurality of signal lines (not shown) electrically connected to the pixels. The second substrate 200 is disposed on the first substrate 100 such that a portion of the first substrate 100 is exposed, e.g., portion of the first substrate 100 is not covered by the second substrate 200, as shown in FIG. 1. The liquid crystal layer 300 is disposed between the first substrate 100 and the second substrate 200. Liquid crystal molecules (not shown) of the liquid crystal layer 300 are arranged according to an electric field generated between the first substrate 100 and the second substrate 200. The seal line 400 is disposed between the first substrate 100 and the second substrate 200 to seal the liquid crystal layer 300 between the first substrate 100 and the second substrate 200.

Figure 2:
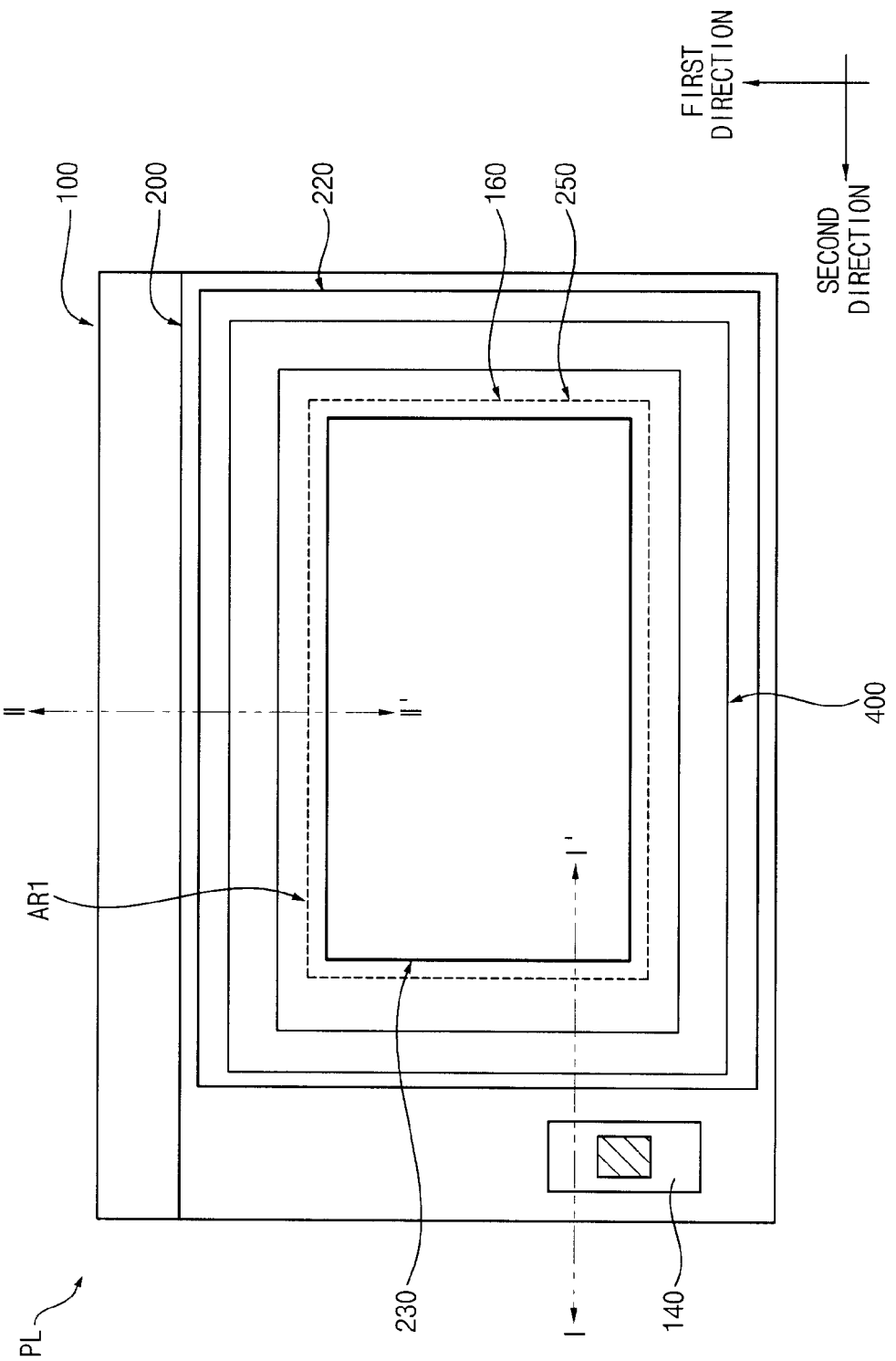
FIG. 2 is a plan view layout illustrating the display panel according to the exemplary embodiment of the present invention in FIG. 1.
Figure 3:
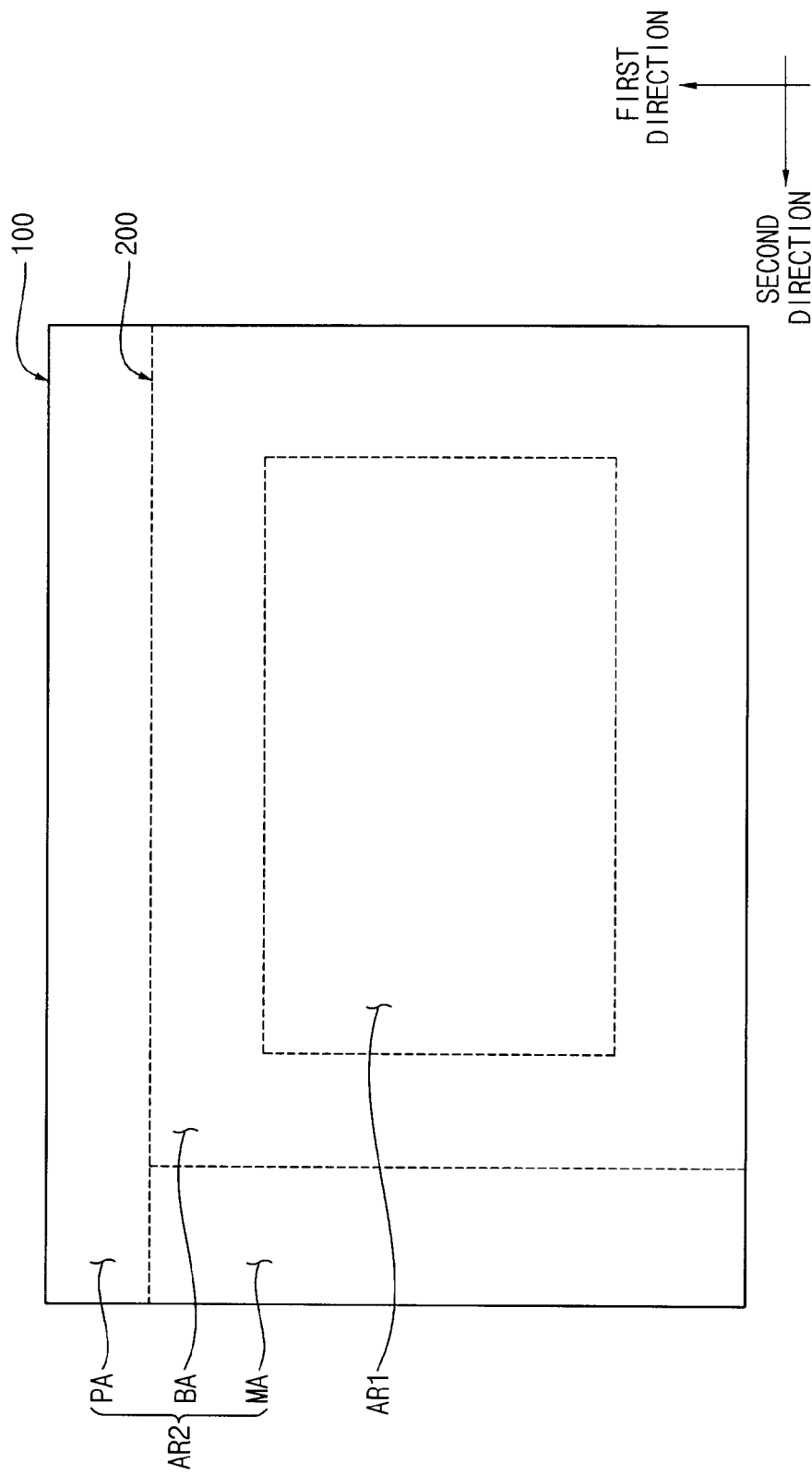
FIG. 3 is a plan view layout illustrating a first substrate, divided into a plurality of regions, of the display panel according to the exemplary embodiment of the present invention in FIG. 1.

FIG. 2 is a plan view layout illustrating the display panel according to the exemplary embodiment of the present invention in FIG. 1, and FIG. 3 is a plan view layout illustrating a first substrate, divided into a plurality of regions, of the display panel according to the exemplary embodiment of the present invention in FIG. 1.

Referring to FIG. 3, the first substrate 100 includes a display region AR1 for displaying an image and a peripheral region AR2 surrounding the display region AR1. The peripheral region AR2 includes a light blocking region BA, an outer peripheral region MA, and a pad region PA.

Further referring to FIG. 3, the light blocking region BA is formed adjacent to the display region AR1 such that the light blocking region BA surrounds the display region AR1. The outer peripheral region MA corresponds to a left side of the second substrate 200. Further, the outer peripheral region MA is adjacent to a left side of the light blocking region BA. The pad region PA corresponds to an upper side of the second substrate 200, and is adjacent to the light blocking region BA. A longitudinal component of the outer peripheral region MA extends along a first direction to meet the pad region PA, and a longitudinal component of the pad region PA extends along a second direction, as shown in FIG. 3.

Each of the display region AR1, the light blocking region BA, the outer peripheral region MA and the pad region PA has a rectangular shape, for example, but is not limited thereto.

Referring to FIGS. 2 and 3, a plurality of pixels (not shown) is formed in the display region AR1. A panel naming mark 140 is formed in the outer peripheral region MA. A plurality of connection pads (not shown) is formed in the pad region PA. The seal line 400 (FIG. 1) is formed in the light blocking region BA between the first substrate 100 and a light blocking layer 220 (FIG. 2) of the second substrate 200.

Figure 4:
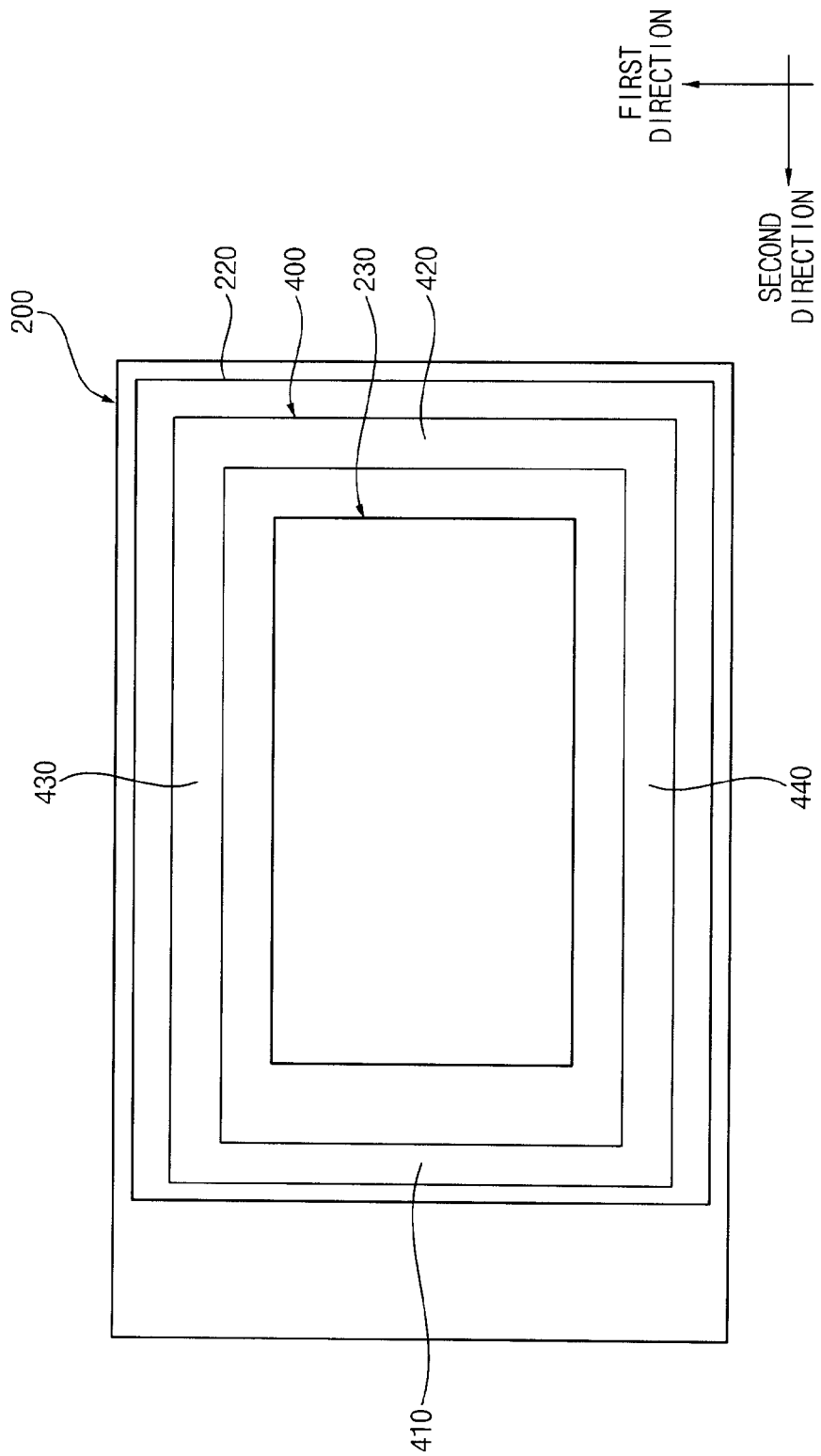
FIG. 4 is a plan view layout illustrating a positional relationship between a second substrate and a seal line of the display panel according to the exemplary embodiment of the present invention in FIG. 1.
Figure 5:
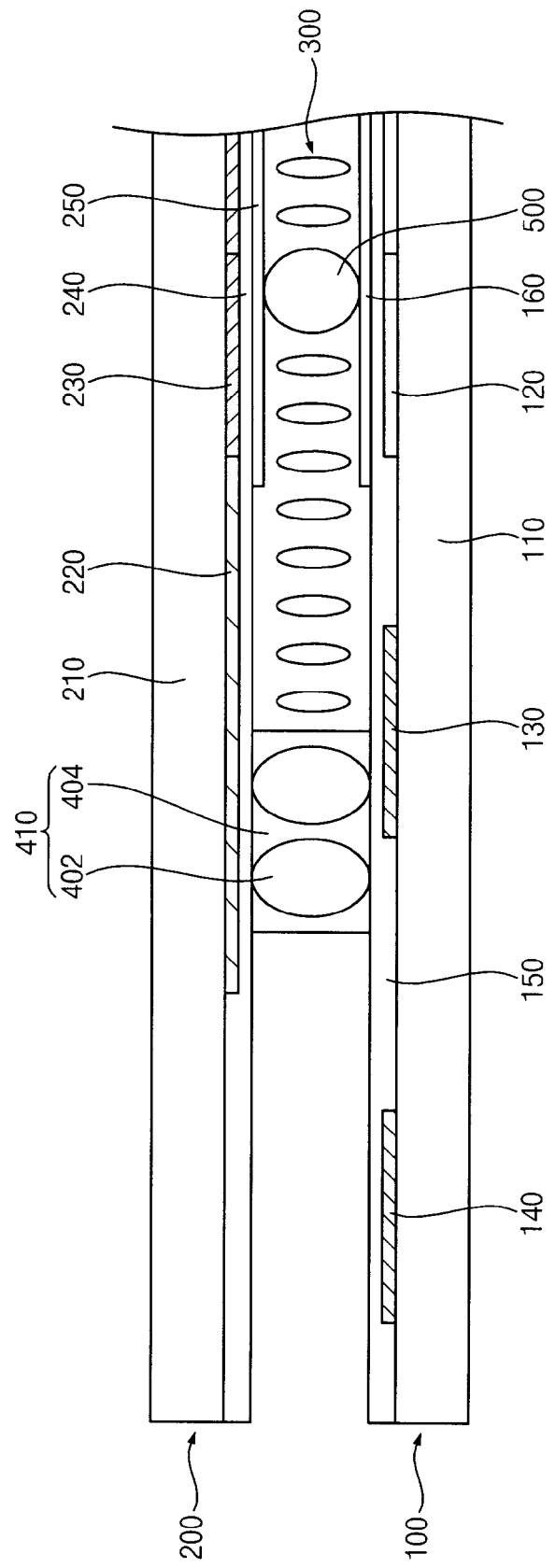
FIG. 5 is a partial cross-sectional view taken along line I-I' of the display panel according to the exemplary embodiment of the present invention in FIG. 2.

FIG. 4 is a plan view layout illustrating a positional relationship between a second substrate and a seal line of the display panel according to the exemplary embodiment of the present invention in FIG. 1, and FIG. 5 is a partial cross-sectional view taken along line I-I' of the display panel according to the exemplary embodiment of the present invention in FIG. 2.

Referring to FIGS. 2 to 5, the display panel PL includes the first substrate 100, the second substrate 200, the liquid crystal layer 300, the seal line 400 and a cell gap maintaining member 500.

The first substrate 100 includes a first base substrate 110, a pixel part 120, a signal line part (not shown), a gate driving part 130, the panel naming mark 140, a first protection layer 150, and a first alignment layer 160.

The first base substrate 110 includes a transparent material. For example, the first base substrate 110 may include glass, quartz or synthetic resin, but is not limited thereto in alternative exemplary embodiments. As shown in FIG. 5, the first base substrate 110 has a substantially rectangular cross-sectional shape. The first base substrate 110 includes the display region AR1 and the peripheral region AR2. The peripheral region AR2 includes the light blocking region BA, the outer peripheral region MA and the pad region PA, as described above in greater detail.

The pixel part 120 is formed in the display region AR1. The pixel part 120 includes a plurality of pixels (not shown) arranged in a substantially matrix pattern. Each pixel of the plurality of pixels of the pixel part 120 includes a thin-film transistor ("TFT") (not shown) and a pixel electrode (not shown) electrically connected to a drain electrode of the TFT. The pixel electrode includes a transparent and conductive material, for example, but is not limited thereto.

The signal line part (not shown) is formed in the display region AR1 and the peripheral region AR2. The signal line part includes a gate line (not shown) electrically connected to a gate electrode of the TFT, and a data line (not shown) electrically connected to a source electrode of the TFT.

The gate driving part 130 is formed in the peripheral region AR2. More specifically, the gate driving part 130 is formed in at least one lateral end portion the peripheral region AR2 of two lateral end portions of the peripheral region AR2 each aligned substantially parallel to the second direction. Further, the gate driving part 130 may be formed in the light blocking region BA of the peripheral region AR2. In alternative exemplary embodiments, the gate driving part 130 may be formed in a portion of the light blocking region BA and a portion of the outer peripheral region MA. As a result, at least a portion of the gate driving part 130 is covered by the light blocking layer 220 in the light blocking region BA.

The gate driving part 130 is electrically connected to the gate line to apply gate signals to the gate line. The gate signals applied to the gate line are applied to the TFT to turn on or turn off the TFT. Thus, the gate driving part 130 includes a plurality of driving TFTs (not shown) formed during a process of forming the TFT in the display region AR1.

The panel naming mark 140 is formed in the outer peripheral region MA of the peripheral region AR2. More specifically, the panel naming mark 140 may be formed, for example, in an end portion of the outer peripheral region MA disposed opposite to the pad region PA, but is not limited thereto. The panel naming mark 140 indicates characteristics and records of the display panel PL, for example, but is not limited thereto. More specifically, the panel naming mark 140 may include records such as a specification, a model name, a manufacturing site or a manufacturing time, for example.

The first protection layer 150 is formed on the first base substrate 110 and covers the pixel part 120 and the gate driving part 130. The first protection layer 150 includes, for example, silicon oxide ("SiOx") or silicon nitride ("SiNx"), but is not limited thereto in alternative exemplary embodiments of the present invention.

Referring to FIG. 5, the first alignment layer 160 is formed on the first protection layer 150. More specifically, the first alignment layer 160 is formed on the first protection layer 150 to cover the display region AR1. Therefore, the first alignment layer 160 has an area larger than an area of the first display region AR1 to completely cover the display region AR1.

A plurality of connection pads (not shown) may be formed in the pad region PA of the first base substrate 110. Connection pads of the plurality of connection pads may be arranged longitudinally along the second direction. The connection pads are electrically connected to respective data lines (not shown), to provide data signals an outside device to the TFT. Furthermore, connection pads of the plurality of connection pads may be electrically connected to the gate driving part 130 to apply gate control signals to the gate driving part 130.

The connection pads may be electrically connected to a flexible printed circuit board ("FPCB") (not shown) or to a driving chip (not shown).

Still referring to FIG. 5, the second substrate 200 includes a second base substrate 210, the light blocking layer 220, a color filter layer 230, a second protection layer 240 and a second alignment layer 250.

The second base substrate 210 includes a transparent material. For example, the second base substrate 210 may include glass, quartz or synthetic resin, but is not limited thereto. The second base substrate 210 has a substantially rectangular cross-sectional shape, as shown in FIG. 5.

The second base substrate 210 is disposed over the first base substrate 110 to cover the panel naming mark 140. More specifically, the second base substrate 210 has a length equal to a corresponding length of the first base substrate 110 substantially parallel to the second direction, so that opposite end portions of the second base substrate 210 along the second direction coincide with opposite end portions of the first base substrate 110 along the second direction. However, the second base substrate 210 has a shorter length than a length of the first base substrate 110 along the first direction, so that the pad region PA of the first base substrate 110 is not covered by the second base substrate 210 as shown in FIGS. 1 to 3.

The second base substrate 210 includes a transparent material as, described above in greater detail. Therefore, even when the second base substrate 210 covers the outer peripheral region MA of the first base substrate 110, the panel naming mark 140 formed in the outer peripheral region MA is visible through the second base substrate 210.

The connection pads for controlling the gate driving part 130 are formed in the pad region PA, e.g., are not formed in the outer peripheral region MA. Therefore, the second base substrate 210 covers not only the display region AR1 and the light blocking region BA but also the outer peripheral region MA.

The light blocking layer 220 is formed on a side of the second base substrate 210 facing the first substrate 100. The light blocking layer 220 includes an organic material or an inorganic material, for example, which blocks light.

The light blocking layer 220 is formed along a peripheral area of the display region AR1 such that the light blocking layer 220 does not overlap the panel naming mark 140. More specifically, the light blocking layer 220 may be formed corresponding to the light blocking region BA such that the light blocking layer 220 has substantially the same area as the light blocking region BA. In alternative exemplary embodiments, the light blocking layer 220 may be formed corresponding to the light blocking region BA such that the light blocking layer 220 has an area smaller than an area of the light blocking region BA. Further, the light blocking layer 220 may be formed in the light blocking region BA as well as in a portion of the outer peripheral region MA.

Thus, the light blocking layer 220 may have a substantially rectangular shape when viewed from a top perspective, e.g., when viewing a top plan view. In other words, the light blocking layer 220 may have an opening, e.g., an open interior of the substantially rectangular shape, exposing the display region AR1.

In an exemplary embodiment of the present invention, the light blocking layer 220 has a width of about 3 millimeter ("mm") to about 4 mm, but is not limited thereto. Further, the light blocking layer 220 may have a constant width or, in alternative exemplary embodiments, the light blocking layer 220 may have a width which varies according to a position along sides of the blocking layer 220. For example, a left side portion of the light blocking layer 220 which is adjacent to the outer peripheral region MA may have a width greater than a width of a right side portion of the light blocking layer 220 opposite to the left side portion.

Since the second base substrate 210 extends to cover not only the display region AR1 and the light blocking region BA, but also the outer peripheral region MA, the width of the left side portion of the light blocking layer 220 in an exemplary embodiment of the present invention may be larger in comparison with a width of the left portion of a light blocking layer in a second base substrate of a display panel of the prior art.

The color filter layer 230 is formed on the second base substrate 210 facing the first substrate 100. The color filter layer 230 includes a plurality of color filters (not shown), each of which corresponds to a pixel of the pixel part 120. The color filter layer 230 includes a red color filter, a green color filter and a blue color filter, for example. In an exemplary embodiment, the color filter layer 230 is formed on the second base substrate 210. In alternative exemplary embodiments, the color filter layer 230 may be formed on the first base substrate 110.

The second protection layer 240 is formed on the second base substrate 210 to cover the light blocking layer 220 and the color filter layer 230, as shown in FIG. 5. The second protection layer 240 includes, for example, SiOx or SiNx, but is not limited thereto.

The second alignment layer 250 is formed on the second protection layer 240 such that the second alignment layer 250 covers the display region AR1. Thus, the second alignment layer 250 has an area greater than an area of the display region AR1 to completely cover the display region AR1. For example, the second alignment layer 250 may have substantially the same area as the first alignment layer 160, but is not limited thereto.

Still referring to FIG. 5., the liquid crystal layer 300 is disposed between the first substrate 100 and the second substrate 200. More specifically, the liquid crystal layer 300 is disposed between the first alignment layer 160 and the second alignment layer 250. Liquid crystal molecules (not shown) of the liquid crystal layer 300 are aligned along a specific direction between the first alignment layer 160 and the second alignment layer 250 due to the first alignment layer 160 and the second alignment layer 250.

The seal line 400 (FIG. 1) is disposed in the peripheral region AR2 (FIG. 3) between the first substrate 100 and the second substrate 200. More specifically, the seal line 400 is formed along a peripheral portion of the display region AR1 such that the seal line 400 is separated from the display region AR1. At least a portion of the seal line 400 overlaps the light blocking layer 220. The seal line 400 combines the first substrate 100 and the second substrate 200, and seals the liquid crystal layer 300 therebetween.

Referring to FIGS. 4 and 5, the seal line 400 includes a first seal line portion 410, a second seal line portion 420, a third seal line portion 430 and a fourth seal line portion 440.

As shown in FIG. 4, the first seal line portion 410 is formed on a portion of the light blocking region BA facing a left side of the display region AR1, when viewed from a top perspective, e.g., viewing a top plan view, and also faces the outer peripheral region MA. The second seal line portion 420 is formed at an opposite right side of the display region AR1.

The third seal line portion 430 is formed at an upper side of the display region AR1 facing the pad region PA, and the fourth seal line portion 440 is formed at an opposite lower side of the display region.

In an exemplary embodiment, the seal line 400 has a uniform width regardless of a position along a side of the seal line 400. In alternative exemplary embodiments, the seal line 400 may have a width which varies according to a position along a side of the seal line 400. For example, the first seal line portion 410, the second seal line portion 420, the third seal line portion 430 and the fourth seal line portion 440 may each have a different width than the others. In an exemplary embodiment, respective widths of the first seal line portion 410, the second seal line portion 420, the third seal line portion 430 and the fourth seal line portion 440 may have a range of about 1.1 mm to about 1.3 mm, but are not limited thereto.

In exemplary embodiments, the first seal line portion 410, the second seal line portion 420, the third seal line portion 430 and the fourth seal line portion 440 are each disposed nearer to the light blocking layer 220 than to the display region AR1, as shown in FIG. 2. Further, a distance between the light blocking layer 220 and an outline of the display region AR1, e.g., referring to FIG. 2, a distance between the color filter 230, which corresponds to edges of the light blocking layer, 230, and the dashed line designating the display region AR1) is in a range from about 1.5 mm to about 2.3 mm, for example, but is not limited thereto in alternative exemplary embodiments.

As a result, a distance between each of the first seal line portion 410, the second seal line portion 420, the third seal line portion 430 and the fourth seal line portion 440 and the outline of the display region AR1 may be equal, or may be different in alternative exemplary embodiments. For example, a distance between the first seal line portion 410 and the outline of the display region AR1 may be longer than a distance between the second seal line portion 420 and the outline of the display region AR1, as shown in FIGS. 2 and 4, since the first seal line portion 410 according to an exemplary embodiment of the present invention is shifted toward the outer peripheral region MA (FIG. 3) as compared to a first seal line portion of a display panel of the prior art. Thus, the first seal line portion 410 the second base substrate 210 according to an exemplary embodiment of the present invention extend to cover not only the display region AR1 and the light blocking region BA, but also the outer peripheral region MA.

Referring back to FIG. 5, each of the first seal line portion 410, the second seal line portion 420, the third seal line portion 430 and the fourth seal line portion 440 may include a seal spacer 402 and a sealant 404. The seal spacer 402 separates the first substrate 100 and the second substrate 200 from each other. The sealant 404 surrounds the seal spacer 402 and combines the first substrate 100 and the second substrate 200.

Still referring to FIG. 5, the cell gap maintaining member 500 is disposed between the first substrate 100 and the second substrate 200 to maintain a separation distance therebetween. Further, a plurality of cell gap maintaining members 500 may be disposed in the display region AR1. In addition, dot spacers having elasticity and being substantially a same size and shape may be employed as individual cell gap maintaining members 500 of the plurality of cell gap maintaining members 500, but alternate exemplary embodiments are not limited thereto.

In an exemplary embodiment of the present invention, the gate driving part 130 may be formed between the first seal line portion 410 and the display region AR1. When the gate driving part 130 is formed between the first seal line portion 410 and the display region AR1, a portion of the gate driving part 130 may overlap a portion of the first seal line portion 410, as shown in FIG. 5. In an alternative exemplary embodiment, a portion of the gate driving part 130 does not overlap a portion of the first seal line portion 410.

Figure 6:
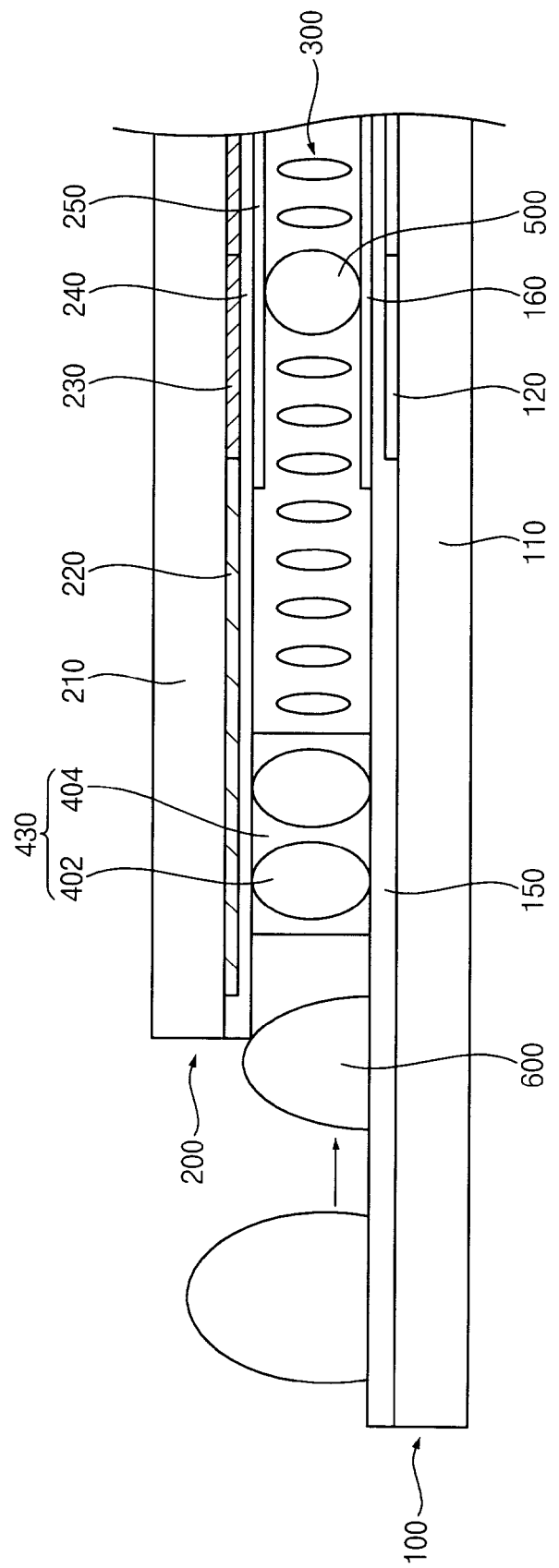
FIG. 6 is a partial cross-sectional view taken along line II-II' of the display panel according to the exemplary embodiment of the present invention in FIG. 2.

FIG. 6 is a partial cross-sectional view taken along line II-II' of the display panel according to the exemplary embodiment of the present invention in FIG. 2.

Referring to FIG. 6, the third seal line portion 430 includes a seal spacer 402 and a sealant 404, as described above in greater detail with reference to the first seal line portion 410 in FIG. 5.

Referring to FIGS. 2, 3 and 6, the display panel PL according to an exemplary embodiment of the present invention may further include a water-proof member 600.

The water-proof member 600 is formed in the pad region PA adjacent to the second substrate 200 along an upper side of the second substrate 200 when viewed from a top perspective, e.g., when viewing a top plan view of the display apparatus. More specifically, the water-proof member 600 extends along the first direction (FIG. 2) to prevent water from penetrating into a space between the first substrate 100 and the second substrate 200. The water-proof member 600 includes silicon, for example, but is not limited thereto.

In an exemplary embodiment of the present invention, the first substrate 100 and the second substrate 200 are protected from water penetration, since the water-proof member 600 blocks water from entering a space between the first substrate 100 and the second substrate 200.

Figure 7:
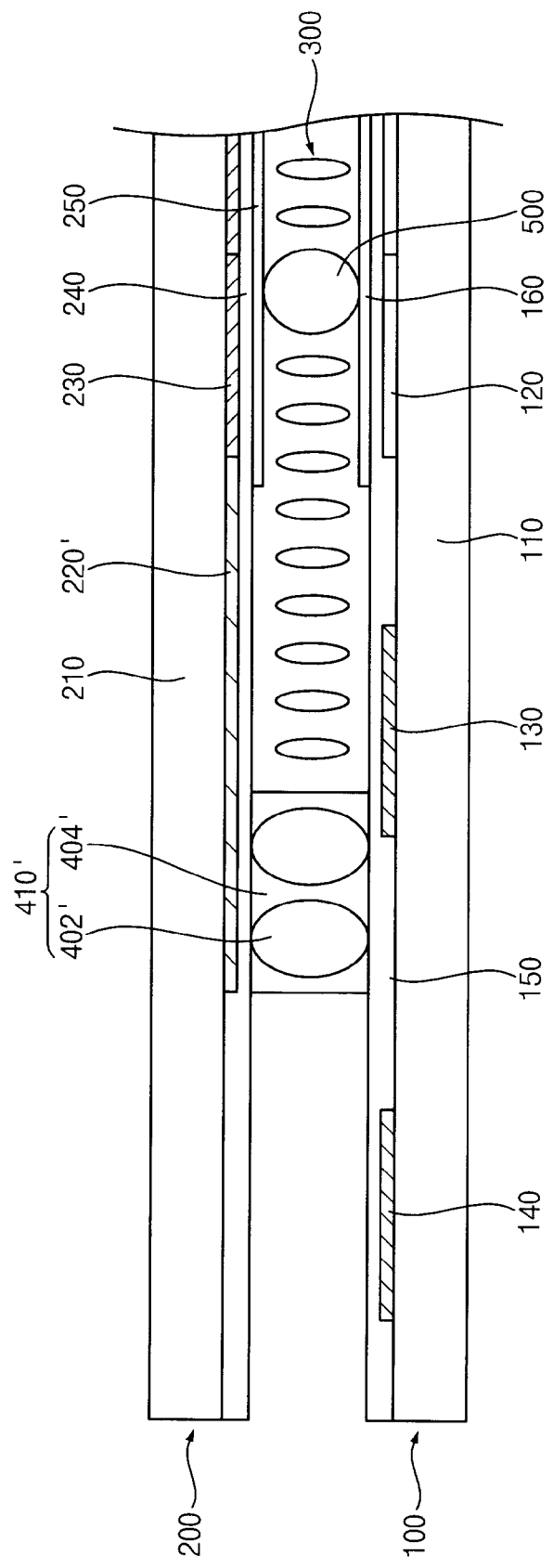
FIG. 7 is a partial cross-sectional view taken along line I-I' of FIG. 2 illustrating a display panel according to an alternative exemplary embodiment of the present invention.
Figure 8:
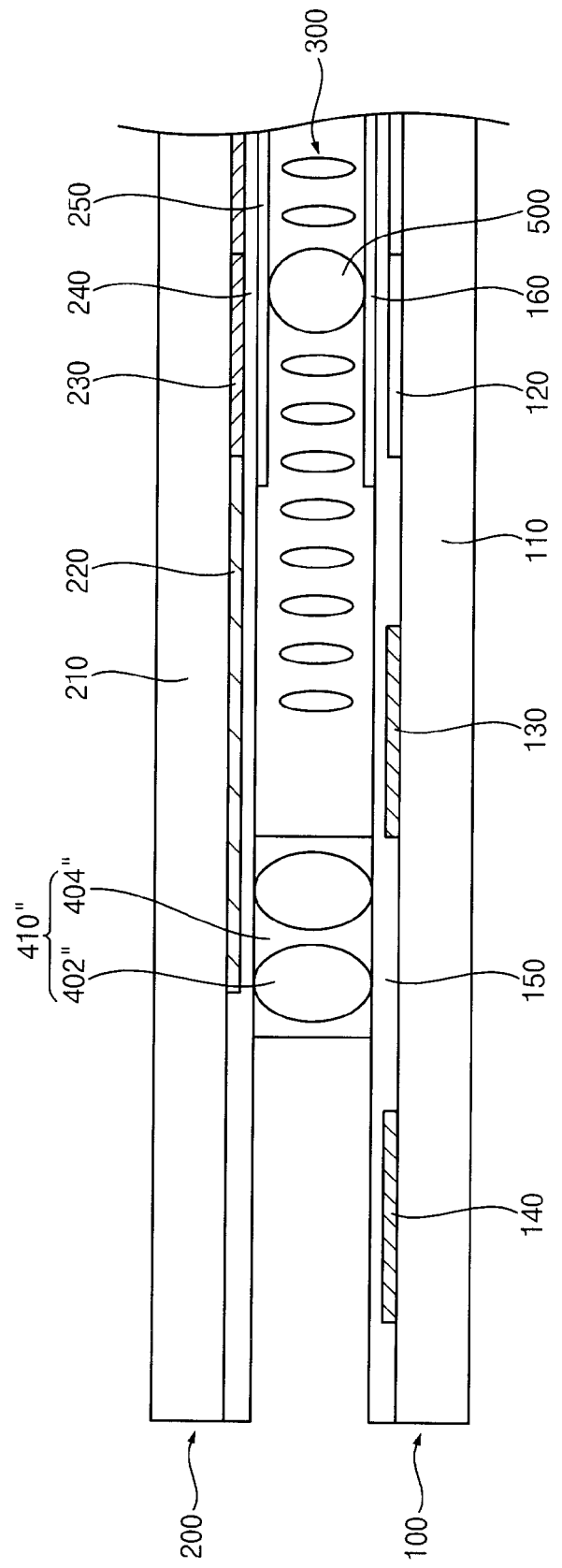
FIG. 8 is a partial cross-sectional view taken along line I-I' of FIG. 2 illustrating a display panel according to another alternative exemplary embodiment of the present invention.

FIG. 7 is a partial cross-sectional view taken along line I-I' of FIG. 2 illustrating a display panel according to an alternative exemplary embodiment of the present invention. FIG. 8 is a partial cross-sectional view taken along line I-I' of FIG. 2 illustrating a display panel according to another alternative exemplary embodiment of the present invention. The display panels shown in FIGS. 7 and 8 are substantially the same as the display panel described in greater detail above in reference to FIG. 5 except for a positional relationship between the first seal line portion 410 and the light blocking layer 220, as described in further detail below. Thus, the same reference numerals will be used to refer to the same or like components as described in reference to FIG. 5, and any repetitive explanation thereof will be omitted below.

Referring to FIG. 7, an end of a first seal line portion 410' having a seal spacer 402' and a sealant 404' coincides with an end of a light blocking layer 220'.

Referring to FIGS. 3 and 8, a first seal line portion 410" having a seal spacer 402" and a sealant 404" may be formed such that at least a portion of the first seal line portion 410" overlaps the outer peripheral region MA. More specifically, the first seal line portion 410" is formed over both a portion of the light blocking region BA and a portion of the outer peripheral region MA. In alternative exemplary embodiments, the first seal line portion 410" may be formed only in the outer peripheral region MA. Further, the first seal line portion 410" does not cover the panel naming mark 140.

Thus, according to an exemplary embodiment of the present invention as described above, the second substrate 200 faces the first substrate 100 and covers the outer peripheral region MA of the first substrate 100. Therefore, moisture is prevented from condensing to form water droplets on the outer peripheral region MA. As a result, penetration of the water is effectively prevented or substantially reduced. Thus, a water-proof member formed in an outer peripheral region of display panel of the prior art may be omitted, thereby reducing manufacturing cost and subsequently enhancing manufacturing efficiency of the display panel according to exemplary embodiments of the present invention.

According to an alternative exemplary embodiment of the present invention described above, the second substrate 200 is extended to cover the outer peripheral region MA of the first substrate 100. Therefore, a position of the first seal line portion 410 may be shifted further toward the outer peripheral region MA in comparison with a position of a first seal line portion of a display panel of the prior art.

As a result, when the position of the first seal line 410 is shifted toward the outer peripheral region MA, a material for the first seal line portion 410 is prevented from spreading toward the liquid crystal layer 300 before the material is cured. Therefore, contamination of the liquid crystal layer 300 in the display region AR1 is effectively prevented or substantially reduced.

Additionally, when the first seal line portion 410 is shifted toward the outer peripheral region MA, a difference between a first cell gap (e.g., a distance between the first substrate 100 and the second substrate 200) measured at a center point of the display region AR1 and a second cell gap measured at a peripheral point of the display region AR1, is effectively reduced, as will now be described in further detail with reference to FIGS. 9 and 10.

Figure 9:
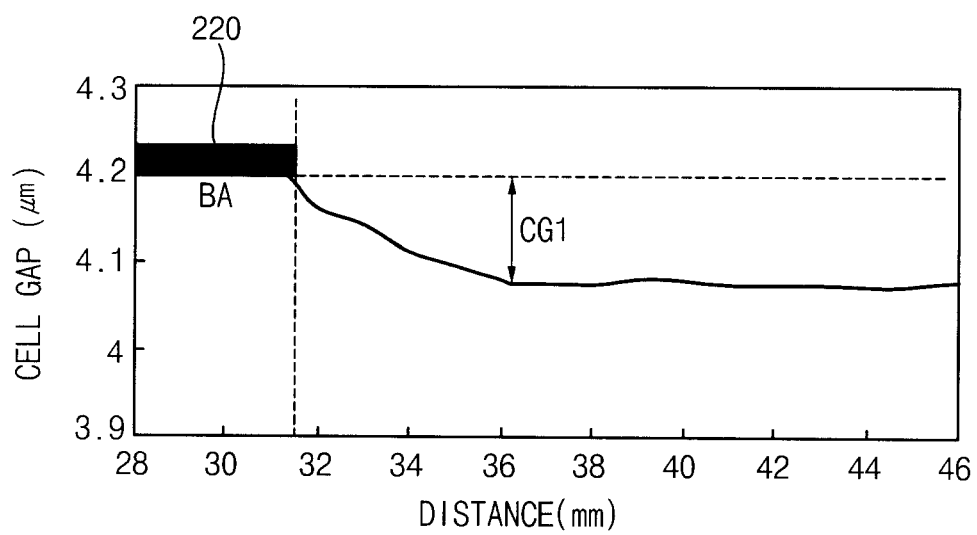
FIG. 9 is a graph of cell gap versus distance illustrating a relationship between a cell gap and a position in a display panel of the prior art.
Figure 10:
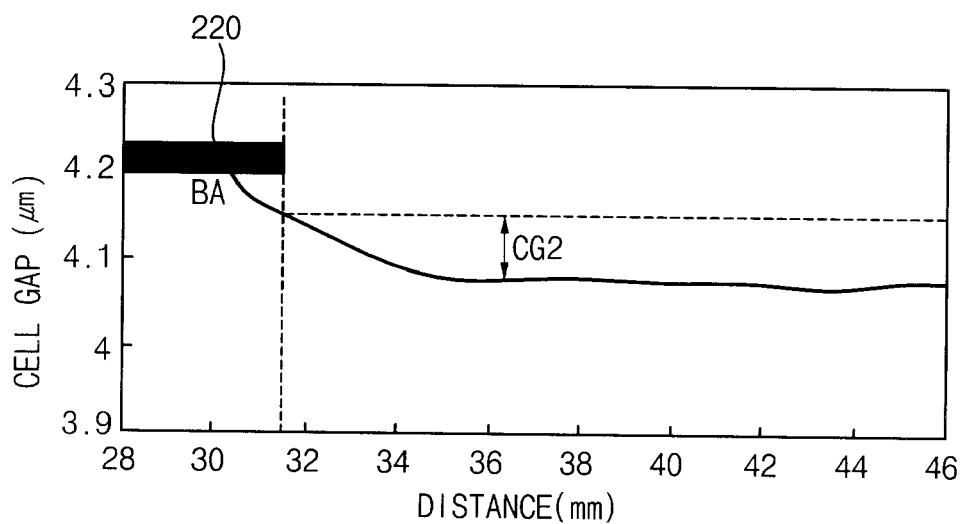
FIG. 10 is a graph of cell gap versus distance illustrating a relationship between a cell gap and a position in the display panel according to the exemplary embodiment of the present invention in FIG. 1.

FIG. 9 is a graph of cell gap versus distance illustrating a relationship between a cell gap and a position in a display panel of the prior art, and FIG. 10 is a graph of cell gap versus distance illustrating a relationship between a cell gap and a position in the display panel according to the exemplary embodiment of the present invention in FIG. 1. More specifically, FIGS. 9 and 10 illustrate changes in cell gap values (in micrometers) as a distance (in mm) from the light blocking region BA, e.g., a peripheral edge of the display region, towards a center point of the display region AR1 increases.

Referring to FIGS. 2, 3 and 9, a cell gap between a first substrate 100 and a second substrate 200 of a display panel of the prior art, measured from a measuring point at a peripheral edge of a display region AR1, e.g., where the measuring point is about 32 mm, is about 4.2 micrometers ("µm"), and the cell gap decreases as the measuring point moves from the edge of the display region AR1 toward a center of the display region AR1. The cell gap measured at an approximate center of the display region AR1, e.g., where the measuring point is about 36 mm, is about 4.1 µm, as shown in FIG. 9. In short, a first cell gap difference CG1 of the cell gap measured at the edge of the display region AR1 and the cell gap measured at the center of the display region AR1 of a display panel of the prior art is about 0.1 μm.

Referring to FIGS. 2 and 8, the seal line 400 is disposed at peripheral edge portions of the display panel PL, and the cell gap maintaining members 500 are disposed at center portions of the display panel PL. Therefore, a cell gap at the peripheral edge portions is relatively constant, e.g., is fixed by the seal line 400. In contrast, a cell gap at a center portion varies, e.g., is not as strongly fixed by the cell gap maintaining members 500 with respect to the cell gap at the peripheral edge portions.

When a difference between cell gaps increases, e.g., in the case of the first cell gap difference CG1 of a display panel of the prior art (FIG. 9), images vary according to a position on the display panel of the prior art. Therefore, a display quality deteriorates in a display panel of the prior art.

However, referring to FIGS. 2, 3 and 10, in the display panel PL according to an exemplary embodiment of the present invention, the first seal line portion 410 is shifted toward the outer peripheral region MA, and a region having a higher cell gap, as compared to a cell gap closer to a center point of the display region AR1, shifts farther from the center point of the display region AR1, e.g., a cell gap of about 4.2 μm, is shifted toward the outer peripheral region MA where a measuring point is about 30 mm (FIG. 10).

As a result, a cell gap at the peripheral edge of the display region AR1 in the display panel PL according to an exemplary embodiment of the present invention is reduced to about 4.15 μm, as shown in FIG. 10. Further, a cell gap at an approximate center portion of the display region AR1, e.g., at a measuring point of about 36 mm, is about 4.1 μm. Thus, a second cell gap difference CG2 according to an exemplary embodiment of the present invention is to about 0.5 μm, e.g., is effectively reduced in comparison to the first cell gap difference CG1 of the display panel of the prior art.

As described above, a cell gap difference according to exemplary embodiments of the present invention is effectively reduced in comparison with the display panel of the prior art, and a display quality is thereby enhanced. In addition, when the first seal line portion 410 is shifted outward toward the outer peripheral region MA, a size of the display region AR1 may also be increased by shifting the display region AR1 outward toward the outer peripheral region MA, thereby effectively increasing a display size of the display panel PL according to exemplary embodiments of the present invention.

Figure 11:
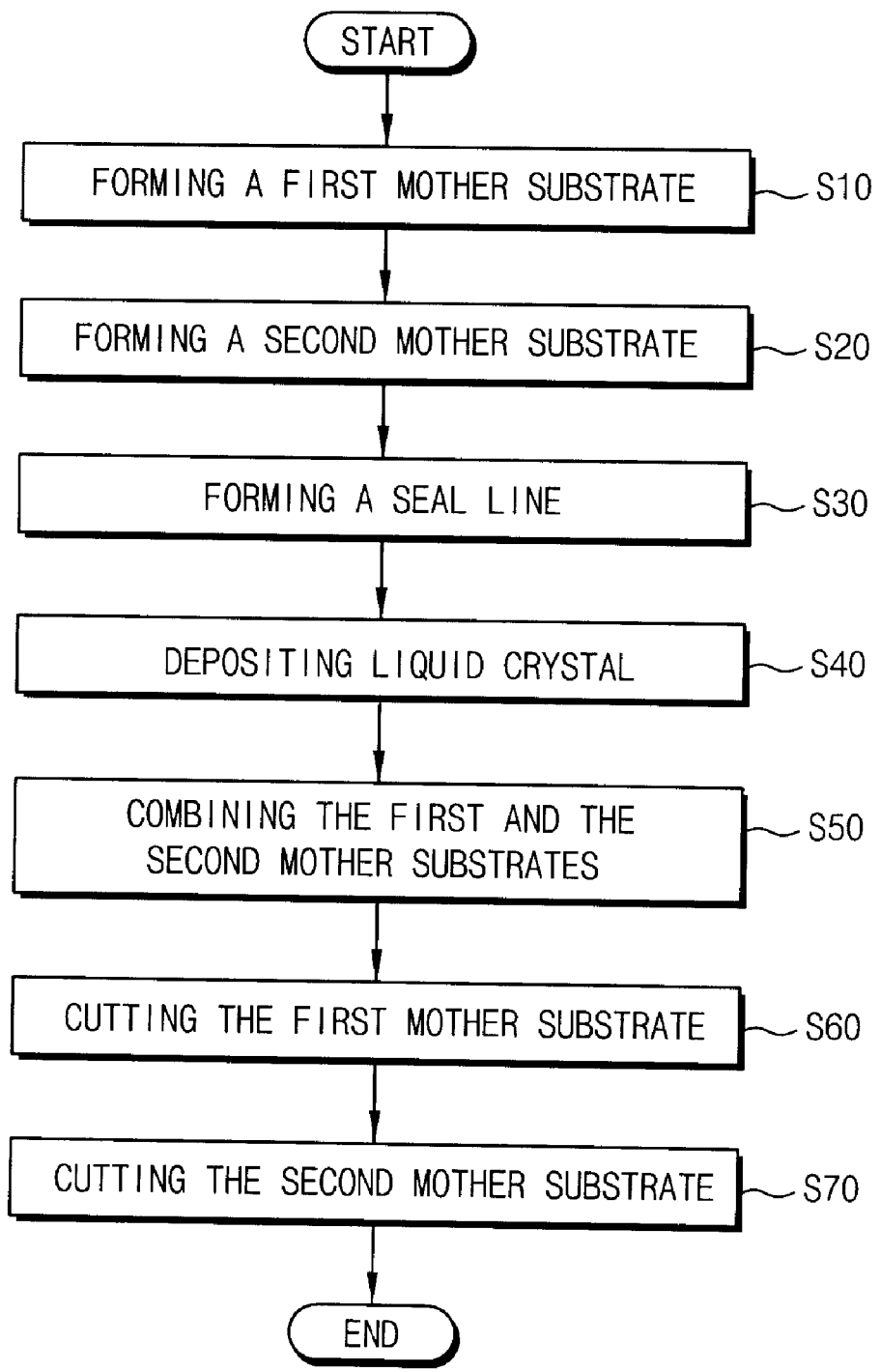
FIG. 11 is a flow chart illustrating a method of manufacturing a display panel according to an exemplary embodiment of the present invention.

FIG. 11 is a flow chart illustrating a method of manufacturing a display panel according to an exemplary embodiment of the present invention.

The method of manufacturing the display panel described above will now be described in further detail with reference to FIGS. 1 to 11.

Referring to FIG. 11, in step S10, a first mother substrate (not shown) including the pixel part 120 formed in the display region AR1, and the panel naming mark 140 formed in the outer peripheral region MA is formed. The first mother substrate may include a plurality of the first substrates 100, each of which includes the pixel part 120 formed in the display region AR1, and the panel naming mark 140 formed in the outer peripheral region MA.

The first mother substrate may further include gate lines (not shown) extending along the first direction, data lines (not shown) extending along the second direction, the gate driving part 130, the first protection layer 150 and the first alignment layer 160. In alternative exemplary embodiments, the gate lines may extend in the second direction and the data lines may extend in the first direction.

In step S20, a second mother substrate (not shown) disposed to face the first mother substrate is formed. The second mother substrate includes the light blocking layer 220, the color filter layer 230, the second protection layer 240 and the second alignment layer 250. The second mother substrate may further include a plurality of the second substrates 200, each of which includes the light blocking layer 220, the color filter layer 230, the second protection layer 240, and the second alignment layer 250. The light blocking layer 220 may be formed in an area corresponding to an area in which the peripheral region AR2 is formed, but is not limited thereto in alternative exemplary embodiments.

The step S10 of forming the first mother substrate and the step S20 of forming the second mother substrate may be performed separately. For example, the step S10 of forming the first mother substrate may be performed before the step S20 of forming the second mother substrate is performed. In an alternative exemplary embodiment, the step S20 of forming the second mother substrate may be performed before the step S10 of forming the first mother substrate is performed. In yet another alternative exemplary embodiment, the step S10 of forming the first mother substrate and the step S20 of forming the second mother substrate may be performed simultaneously.

In step S30, the seal line 400 is formed on one of the first mother substrate and the second mother substrate. More specifically, the seal line 400 is formed such that the seal line 400 is separated from and surrounds the display region AR1, as described above in greater detail. Further, the seal line 400 is formed such that the seal line 400 is disposed closer to an outside portion of the light blocking layer 200 than to an outside portion of the display region AR1, as shown in FIG. 2. More specifically, a an end portion of the seal line 400 substantially parallel to the second direction and located on a left peripheral portion of the display panel PL, when viewed from a top perspective, e.g., viewing a top plan view, is closes to a corresponding outside peripheral portion of the light blocking layer 220 substantially parallel to the second direction and located on the left peripheral portion of the display panel PL than to the display region AR1. In an exemplary embodiment, a location of the end portion of the seal line 400 may coincide with a location of an end portion of the light blocking layer 200.

In step S40, liquid crystal is deposited onto one of the first mother substrate and the second mother substrate.

In an exemplary embodiment of the present invention, the step S30 of forming the seal line 400 and the step S40 of depositing the liquid crystal are performed separately. For example, the step S30 of forming the seal line 400 may be performed before the step S40 of depositing the liquid crystal is performed. In an alternative exemplary embodiment of the present invention, the step S40 of depositing the liquid crystal may be performed before the step S30 of forming the seal line 400 is performed. In yet another alternative exemplary embodiment of the present invention, the step S30 of forming the seal line 400 and the step S40 of depositing the liquid crystal may be performed simultaneously.

A respective first mother substrate or second mother substrate onto which the seal line is formed may be the same as or different from a respective first mother substrate or second mother substrate onto which the liquid crystal is deposited.

In step S50, the first mother substrate and the second mother substrate are combined, confining the liquid crystal therebetween. When the first mother substrate and the second mother substrate are combined, the seal line 400 is cured using ultraviolet light or infrared light. As a result, the liquid crystal layer 300 is formed between the first mother substrate and the second mother substrate.

In step S60, a portion of the first mother substrate is cut to form the first substrate 100. More specifically, the first substrate 100, including the pixel part 120, the signal line (not shown), the gate driving part 130, the panel naming mark 140, the first protection layer 150 and the first alignment layer 160, is formed from the first mother substrate.

In step S70, a portion of the second mother substrate is cut to form the second substrate 200. More specifically, the second substrate 200, disposed to cover the panel naming mark 140 and including the light blocking layer 220, the color filter layer 230, the second protection layer 240 and the second alignment layer 250, is formed from the first mother substrate.

As described above in greater detail, the second substrate 200 has a length substantially the same as a length of the first substrate 100 along the second direction, so that opposite end portions of the second substrate 200 along the second direction coincide with opposite end portions of the first base substrate 110 along the second direction. However, the second substrate 200 has a shorter length than a corresponding length of the first substrate 100 along the first direction, so that the pad region PA of the first substrate 100 is not covered by the second substrate 200, as described above in greater detail and shown in FIGS. 1 and 2.

In an exemplary embodiment, the second substrate 200 is formed from the second mother substrate after the first substrate 100 is separated from the first mother substrate. Alternatively, the first substrate 100 may be formed from the first mother substrate after the second substrate 200 is separated from the second mother substrate.

In the method of manufacturing the display panel PL according to an exemplary embodiment of the present invention, the water-proof member 600 may be formed on the pad region PA along peripheral end portions of the second substrate 200 such that the water-proof member 600 is adjacent to the second substrate 200. Further, the second substrate 200 covers the outer peripheral region MA. Therefore, the water-proof member 600 is not formed on the outer peripheral region MA.

In the method of manufacturing the display panel PL according to an exemplary embodiment of the present invention, the first substrate 100 and the second substrate 200 are formed from the first mother substrate and the second mother substrate, respectively, after the first mother substrate and the second mother substrate are combined. However, in an alternative exemplary embodiment of the present invention, the first substrate 100 and the second substrate 200, respectively may be separated from the first mother substrate and the second mother substrate, respectively, and the first substrate 100 and the second substrate 200 may thereafter be combined.

As described herein, in an exemplary embodiment of the present invention, the second substrate 200 is combined with the first substrate 100 such that the second substrate 200 covers the outer peripheral region of the first substrate 100. Therefore, moisture is prevented from condensing to form water droplets on the outer peripheral region of the first substrate 100, and the water droplets are thereby prevented from penetrating into a space between the first substrate and the second substrate, and deterioration of a display quality of the display panel is thereby effectively prevented or substantially reduced. In addition, water-proof member formed in an outer peripheral region of a display panel of the prior art may be omitted, thereby effectively reducing a manufacturing cost enhancing a manufacturing efficiency of the display panel according to exemplary embodiments of the present invention.

Furthermore, according to exemplary embodiments of the present invention, the second substrate 200 extends in the second direction to cover the outer peripheral region of the first substrate 100. Therefore, the seal line 400 may be shifted toward the outer peripheral region MA to increase a distance between the seal line 400 and the display region AR1. Therefore, contamination of the liquid crystal layer by seal line material before the seal line material is cured is effectively prevented or reduced.

Finally, when a portion of the seal line 400 is shifted toward the outer peripheral region MA, a cell gap difference between an edge portion of the display region and a center portion of the display region is effectively reduced to enhance display quality of the display panel according to exemplary embodiments of the present invention as described herein.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A display panel comprising:
    a display region and a first peripheral region surrounding the display region;
    a first substrate including
        a gate line extending in a first direction;
        a data line extending in a second direction substantially perpendicular to the first direction and crossing the gate line;
        a pixel portion formed in the display region and electrically connected to the gate and the data line and;
        and a gate driving part formed in the first peripheral region and electrically connected to the gate line;
    a second substrate facing the first substrate, the second substrate including
        a first end portion and an opposite second end portion which coincide with a first end portion and an opposite second end portion of the first substrate, respectively; and
        a light blocking layer formed on an area of the second substrate corresponding to the first peripheral region;
    a liquid crystal layer formed between the first substrate and the second substrate; and
    a seal line formed between the first substrate and the second substrate to confine the liquid crystal layer therebetween, the seal line being formed in an area outside an outer peripheral edge of the display region, the area outside the outer peripheral edge of the display region being closer to an outer peripheral edge of the light blocking layer than to the outer peripheral edge of the display region.

2. The display panel of claim 1, wherein a first distance from a first side of the seal line substantially parallel to the second direction to a corresponding parallel first side of the display region is greater than a second distance from a second opposite parallel side of the seal line to a corresponding opposite second side of the display region.

3. The display panel of claim 2, wherein an outer lateral edge of the first side of the seal line substantially coincides with an outer lateral edge of the outside perimeter of the light blocking layer.

4. The display panel of claim 1, wherein the pixel portion of the first substrate comprises:
   a thin-film transistor electrically connected to the gate line and the data line; and
   a pixel electrode electrically connected to the thin-film transistor, and
   the gate driving part comprises a driving transistor formed by a process of manufacturing the thin-film transistor.

5. The display panel of claim 4, wherein the gate driving part is formed on at least one of a first end portion of the first substrate and a second opposite end portion of the first substrate.

6. The display panel of claim 5, wherein the gate driving part is formed on an area of the first substrate between the seal line and the display region.

7. The display panel of claim 1, further comprising a second peripheral region, wherein the light blocking layer of the second substrate is not formed on an area of the second substrate corresponding to the second peripheral region.

8. The display panel of claim 7, wherein the seal line comprises:
   a first seal line portion formed at a left side of the display region substantially parallel to the first direction;
   a second seal line portion formed at a right side of the display region opposite to the left side of the display region substantially parallel to the first direction;
   a third seal line portion formed at a top side of the display region substantially parallel to the second direction and connected to an upper end of the first seal line portion and an upper end of the second seal line portion; and
   a fourth seal line portion formed at a bottom side of the display region opposite to the top side of the display region substantially parallel to the second direction and connected to a bottom end of the first seal line portion and a bottom end of the second seal line portion.

9. The display panel of claim 8, wherein a distance between the first seal line portion and the display region is greater than a distance between the second seal line portion and the display region.

10. The display panel of claim 8, wherein an outer left peripheral edge of the first seal line portion coincides with an outer left peripheral edge of the light blocking layer.

11. The display panel of claim 8, wherein the gate driving part is formed between the first seal line portion and the display region.

12. The display panel of claim 8, wherein a first portion of the gate driving part is formed between the first seal line portion and the display region and a second portion of the gate driving part is formed between the second seal line portion and the display region.

13. The display panel of claim 7, wherein the first substrate further comprises a naming mark formed in the second peripheral region under the second substrate.

14. The display panel of claim 1, further comprising a cell gap maintaining member disposed between the first substrate and the second substrate to maintain a cell gap between the first substrate and the second substrate.

15. The display panel of claim 14, wherein the cell gap maintaining member comprises a dot spacer having elasticity.

16. The display panel of claim 1, further comprising a third peripheral region having a pad region and being formed above the first peripheral region and not covered by the second substrate, a longitudinal axis of the third peripheral region being substantially parallel to the second direction,
   wherein the first substrate further comprises a pad formed in the pad region of the third peripheral region.

17. The display panel of claim 16, further comprising a water-proof member formed on the first substrate in the pad region of the third peripheral region adjacent to the second substrate to prevent water from penetrating an area between the first substrate and the second substrate.

18. A method of manufacturing a display panel having a display region and a peripheral region surrounding the display region, the method comprising:
   forming a first mother substrate having a gate line extending along a first direction, a data line extending along a second direction substantially perpendicular to the first direction and crossing the first direction, a pixel portion formed in the display region and electrically connected to the gate line and the data line, and a gate driving part formed in the peripheral region and electrically connected to the gate line;
   forming a second mother substrate having a light blocking layer facing the peripheral region;
   forming a seal line on one of the first mother substrate and the second mother substrate, the seal line being formed in an area outside an outer peripheral edge of the display region, the area outside the outer peripheral edge of the display region being closer to an outer peripheral edge of the light blocking layer than to the outer peripheral edge of the display region;
   depositing liquid crystal onto one of the first mother substrate and the second mother substrate;
   combining the first mother substrate and the second mother substrate to confine the liquid crystal therebetween;
   cutting a portion of the first mother substrate to form a first substrate having the gate line, the data line, the pixel portion and the gate driving part; and
   cutting a portion of the second mother substrate such that a first end portion of the second substrate and an opposite second end portion of the second substrate coincide with a first end portion of the first substrate and an opposite second end portion of the first substrate, respectively.

19. The method of claim 18, wherein the seal line is formed such that a first distance from a first side of the seal line substantially parallel to the second direction to a corresponding parallel first side of the display region is greater than a second distance from a second opposite parallel side of the seal line to a corresponding opposite second side of the display region.

20. The method of claim 19, wherein the seal line is formed such that an outer lateral edge of the first side of the seal line substantially coincides with an outer lateral edge of the outside perimeter of the light blocking layer.

* * * * *